United States Patent Office 3,342,798
Patented Sept. 19, 1967

3,342,798
PYRIMIDYL AZO DYESTUFFS
Paul Dussy, St-Louis, France, and Jürg Ammann, Basel, and Werner Bossard, Riehen, near Basel, Switzerland, assignors to J. R. Geigy A.-G., Basel, Switzerland
No Drawing. Filed May 22, 1959, Ser. No. 814,997
Claims priority, application Switzerland, May 23, 1958, 59,840, 59,841
15 Claims. (Cl. 260—146)

The present invention concerns new reactive azo dyestuffs and processes for the production thereof. In addition it concerns processes for the dyeing and printing of fibres or textiles made up therefrom by using these new dyestuffs and finally, as industrial product, it concerns the dyed or printed materials themselves.

It has been found that azo dyestuffs which contain at least one trihalogen pyrimidylamino group can be fixed so that they have particularly good fastness to washing on textile material containing hydroxyl groups and proteins such as, for example, cotton or wool.

The new reactive dyestuffs are produced by reacting sulphonated, possibly cupriferous mono- or dis-azo dyestuffs which contain at least one amino group which can be substituted with 2.4.5.6-tetrahalogen pyrimidine wherein the halogen has an atomic weight of at least 35 and not more than 80, the reaction being performed under such conditions that dyestuffs are formed which contain at least one trihalogen pyrimidylamino group.

In the broadest aspect, the dyes of the instant invention correspond to the general Formula I

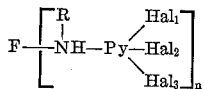

In this formula:

F represents the radical of a sulphonated, cupriferous or nonheavy metal-containing mono- or dis-azo dyestuff,
Hal$_1$, Hal$_2$ and Hal$_3$ each represents a halogen atom of an atomic weight of 35 to 80, in particular chlorine, or also bromine,
Py represents a pyrimidyl radical,
R represents hydrogen or lower alkyl, and
n represents a low whole number, advantageously, possibly also 2.

More specifically, the dyes of the instant invention correspond to the general Formula II

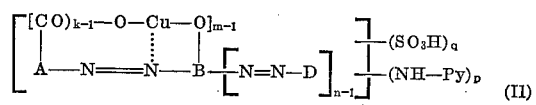

wherein

A represents a radical selected from the group consisting of radicals of the benzene, naphthalene, pyrene, benzthiazole and 2-phenylnaphtho-1.2.3-triazole series,
B represents a radical selected from the group consisting of radicals of the benzene, naphthalene and pyrazole series,
D represents a radical selected from the group consisting of radicals of the benzene and naphthalene series,
Py represents a pyrimidyl radical bound to the NH group in o-position to a ring nitrogen atom and containing 2 halogen atoms in the o-position and 1 halogen atom in the m-position to a ring nitrogen atom, the halogen having an atomic weight of at least 35 and at most 80,
k, m, n and p each represent a whole positive number of at most 2 and q represents a whole positive number of at most 4, the group

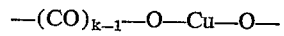

being bound to vicinal positions with respect to the azo group.

It is difficult to determine from the dyestuff molecule which halogen atom of the tetrahalogen pyrimidine is exchanged for the dyestuff amino radical. Very probably the latter radical is bound to the pyrimidine ring in the 2- or 4-position. In this case, the halogen atoms are in the 4.5.6- or 2.5.6-positions. The characteristic radical Py-Hal$_{1-3}$ thus has the structure

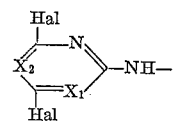

in which Hal has the meaning given above and of X$_1$ and X$_2$ one is tertiary nitrogen (=N—) and the other is =C—Hal.

The amino groups which can be substituted in the aminoazo dyestuffs used as starting products are advantageously primary amino groups.

It is possible however, also to use dyestuffs having secondary amino groups. The one substituent of secondary amino groups is then advantageously low molecular, i.e. for example, a methyl, ethyl or hydroxyethyl group. Aminoazo dyestuffs which contain negative substituents such as e.g. sulphonic acid or arylazo groups in the o-position to the amino groups are less suitable starting products in the present process because of the increased difficulty in substituting these amino groups. Aminoazo dyestuffs in which the substitutable amino groups are aromatically bound are preferred to dyestuffs having aliphatically bound amino groups because they are more easily accessible. The amino group can be bound to an aryl radical linked to the azo group direct or it can be in a substituent of this aryl radical, for example, in a benzoylamino group. Either the diazo or also the coupling component, possibly both and, in disazo dyestuffs, also the middle components can contain amino groups which can be substituted.

In the process according to the invention, chiefly technically easily accessible aminoazo dyestuffs are used which are obtained by coupling diazo components with coupling components. At least one of these components however should contain an amino group which can be substituted in the dyestuff molecule or a substituent which can be converted into such an amino group. Substituents which can be converted into amino groups in the dyestuff molecule are, for example, the nitro group which is reduced and acylamino groups which are saponified.

m- or p-Nitraniline monosulphonic acids and 4- or 5-acylamino-2-aminobenzene - 1 - sulphonic acids, also 4-acylamino-4′-aminodiphenyl-3′-sulphonic acids, 4 - acylamino-3′-aminoazobenzene - 4′ - sulphonic acids and 4-acylamino-4′-aminoazobenzene-3′-sulphonic acids can be used, for example, as diazo components having substituents which can be converted into substitutable amino groups. Amino-hydroxy-naphthalene compounds, in particular the sulphonic acids which can be coupled in an alkaline medium, also aromatic amines coupling in the p-position to a primary or secondary amino group can be used as coupling components containing amino groups. Some of the more important representatives of these two classes of coupling components containing amino groups are: 2-amino-5-hydroxynaphthalene-7-sulphonic acid, 2-amino-8-hydroxynaphthalene-6-sulphonic acid, 1-amino-5-hydroxynaphthalene-7-sulphonic acid, 1-amino - 8 - hydroxynaphthalene-4-sulphonic acid, 1-amino-8-hydroxynaphthalene-3.6- or -4.6-disulphonic acid as well as their m- or p-aminobenzoyl derivatives, 2-m- or -p-aminophenyl-(1'-hydroxynaphtho-5'.6')-thiazole or -imidazole- or -1.2.3-triazole-3'-sulphonic acid, 2-m- or -p-aminobenzoylamino-6-hydroxynaphthalene-8-sulphonic acid, also aniline and derivatives thereof nonionogenically substituted in the 2- and/or 5-position, in particular the alkyl, alkoxy and acylamino compounds, for example methyl, ethyl, hydroxyethyl, methoxy or ethoxy and acetylamino compounds.

When in the starting compound, both the radical of the diazo component and the coupling component each contain a substitutable amino group, then reactive dyestuffs according to the invention having two trihalogen pyrimidylamino radicals are obtained. However, also dyestuffs having more than two such reactive radicals are also within the scope of the invention. Preferred dyestuffs according to the invention however only contain one single trihalogen pyrimidylamino group. For this reason, aminoazo dyestuffs with one single substitutable amino group are the preferred starting compounds.

The starting compounds can contain other substituents usual in azo dyestuffs. They should contain at least one sulphonic acid group; advantageously the end dyestuffs contain two to three such groups. Instead of further sulphonic acid groups, also other acid dissociating, water solubilising groups can be present, such as e.g., carboxyl groups or acylated sulphonic acid amide groups.

Finally, aminoazo dyestuffs used according to the invention can also contain copper bound in complex linkage. In this case they are advantageously the complex copper compounds obtained by known methods from o.o'-dihydroxy or o-hydroxy-o'-carboxy-aminoazo dyestuffs by treatment with agents giving off copper.

The aminoazo dyestuffs are reacted with a tetrahalogen pyrimidine advantageously in the form of the aqueous solutions of their alkali salts. The reaction is performed advantageously at room temperature; sometimes gentle heating to about 40–60° is necessary. The acid formed during the reaction is advantageously buffered or neutralised. Sodium acetate, sodium carbonate, caustic soda lye, pyridine, di- or tri-sodium phosphate or, possibly, mixtures of buffer salts are used as mineral acid binding agents. The reaciton conditions are always so chosen that only one halogen atom of the pyrimidine compound is exchanged. Mild conditions are also indicated in the isolation and drying of the dyestuffs according to the invention in order to prevent the premature exchange of other halogen atoms. Chiefly the easily accessible 2.4.5.6-tetrachloropyrimidine is used as tetrahalogen pyrimidine. As bromine derivative, e.g. the 2.4.6-trichloro-5-bromopyrimidine is used which is obtained, for example from 5-bromobarbituric acid and POCl$_3$ in the presence of a tertiary base. The halogen atom in the 5-position increases the reactivity of the other halogen atoms in the pyrimidine radical. Often it is possible, often it is even indicated, to produce the reactive dyestuffs according to the invention by a somewhat modified process. This consists in building up the dyestuffs from diazo components and coupling components which together contain at least one trihalogen pyrimidylamino substituent. In this case also, the components must be so chosen that the dyestuffs have at least one sulphonic acid group.

Examples of such diazo components are the 4- or 5-trihalogen pyrimidylamino - 2 - aminobenzene-1-sulphonic acids, the 4-trihalogen pyrimidylamino-1-aminonaphthalene-6- or -7-sulphonic acids, 4- or 5-(4'- or 3'-trihalogen pyrimidylamino-benzoylamino) - 2 - aminobenzene-1-sulphonic acids.

Examples of azo components used according to the modified process having a trihalogen pyrimidylamino group as defined are obtained from the coupling components listed above which can be coupled in an alkaline medium and contain amino groups, if they are reacted with a tetrahalogen pyrimidine before being used for coupling. They can be coupled with any diazo compounds, in particular also with diazobenzene sulphonic acids desired.

A valuable class of dyestuffs according to the invention correspond to the general Formula III

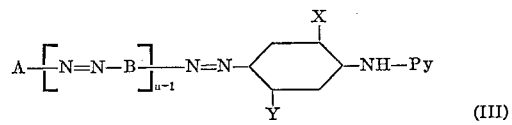

(III)

wherein
A represents a member selected from the group consisting of sulphonated aromatic radicals of the benzene, naphthalene, pyrene, benzthiazole and 2-phenylnaphtho-1.2.3-triazole series,
B represents an aromatic radical containing at least one six-membered carbocyclic nucleus and at most two such nuclei condensed with one another,
Py represents a pyrimidyl radical bound to the NH group in the o-position to a ring nitrogen atom and containing 2 halogen atoms in the o-position and 1 halogen atom in the m-position to a ring nitrogen atom, the halogen having an atomic weight of at least 35 and at most 80,
X represents a member selected from the group consisting of hydrogen, alkyl and alkoxy groups,
Y represents a member selected from the group consisting of hydrogen, alkyl, alkoxy and acylamino groups, and
n represents a whole positive number of at most 2.

Particularly valuable dyestuffs are obtained if A is the radical of a naphthalene disulphonic acid.

A further class of valuable dyestuffs according to the invention corresponds to the general Formula IV

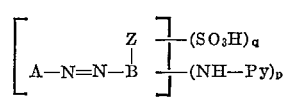

wherein
A represents a radical selected from the group consisting of radicals of the benzene and naphthalene series,
B represents a radical selected from the group consisting of radicals of the naphthalene and pyrazole series,
Py represents a pyrimidyl radical bound to the NH group in the o-position to a ring nitrogen atom and containing 2 halogen atoms in the o-position and 1 halogen atom in the m-position to a ring nitrogen atom, the halogen having an atomic weight of at least 35 and at most 80,
Z represents a member selected from the group consisting of OH and NH$_2$ bound in o-position to the azo group,
p represents a whole positive number of at most 2, and
q represents a whole positive number of at most 4.

Within this class, an important sub-class consists of the coupling products of o-diazobenzene sulphonic acids and 1-hydroxy-naphthalene-3-sulphonic acids which contain an amino group in the 5-, 6-, 7- or 8-position and, possibly, further sulphonic acid groups.

A first group of preferred dyes therefore corresponds to the general Formula V.

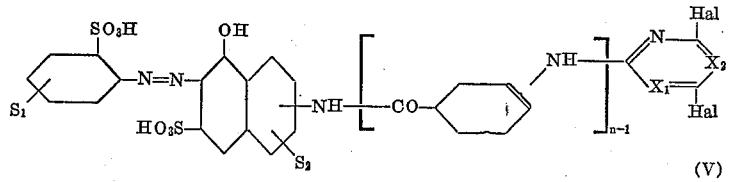

(V)

In this formula:
S₁ represents hydrogen or a substituent selected from the group consisting of halogen, sulphonic acid, lower alkyl, lower fatty acid acyl amino, benzoylamino and

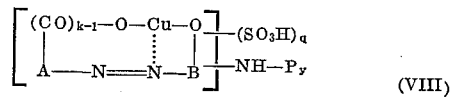 groups $S_2$ represents hydrogen or a sulphonic acid group,
$n$ represents 1 and 2,
one of $X_1$ and $X_2$ represents a tertiary nitrogen (=N—), and the other of $X_1$ and $X_2$ represents =C—Hal, and
Hal represents a halogen atom of an atomic weight of at least 35 and at most 80, preferably chlorine.

In this formula, the amino substituent of the naphthalene radical is preferably situated either in the 6-position (counting $HO/SO_3H$ as 1.3) and $S_2$ is then preferably hydrogen, or in the 8-position and $S_2$ is then preferably —$SO_3H$ in the 5- or preferably in the 6-position. If the pyrimidyl radical is not directly connected with the NH substituent of the naphthalene nucleus, then $S_1$ is preferably $SO_3H$.

A further sub-class of valuable dyestuffs consists of the coupling products of trihalogen pyrimidylamino-2-diazobenzene-1-sulphonic acids and acylated 1-hydroxy-5-, -6-, -7- or -8-aminonaphthalene-3-sulphonic acids in which the acyl radical, for example the acetyl radical, the chloracetyl radical, the β-chloro- or β-bromo propionyl radical, the benzoyl radical, an acylaminobenzoyl radical, the p-toluene sulphonyl radical and the naphthalene radical, can be further sulphonated.

A second group of preferred dyes therefore corresponds to the general Formula VI

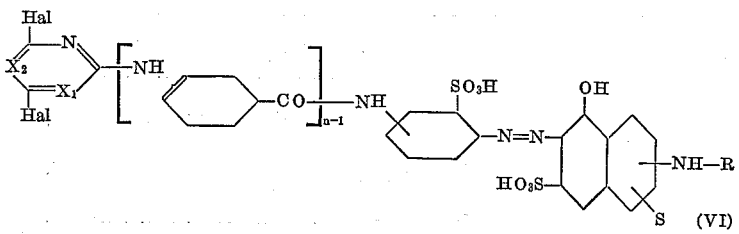

(VI)

In this formula, Hal, $X_1$ and $X_2$ have the same meanings as given in Formula V, S is hydrogen or $SO_3H$ and R is hydrogen or a lower fatty acid acyl or benzoyl.

Also in these dyes, the amino substituent of the naphthalene radical is preferably either in the 6-position (counting $HO/SO_3H$ as 1.3) and S is then hydrogen, or it is in the 8-position and S is then preferably $SO_3H$ in the 6-position.

A further valuable class of dyestuffs according to the invention consists of the coupling products of o-diazobenzene sulphonic acids and 5-hydroxy- or 5-aminopyrazoles. In these products, the amino group which is either substituted or to be substituted is advantageously in the diazo component.

A third group of preferred dyes therefore corresponds to the general Formula VII

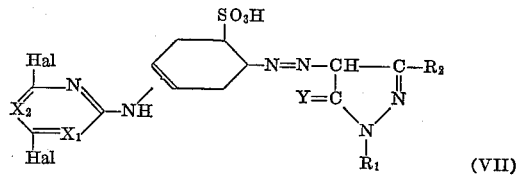

(VII)

Also in this formula, Hal, $X_1$ and $X_2$ have the same meanings as given in Formula V, Y is oxygen or NH, $R_1$ is hydrogen or a radical of the benzene or naphthalene series and $R_2$ is a lower aliphatic radical and preferably $CH_3$.

A last class of valuable azo dyestuffs according to the invention are the complex copper compounds of o.o'-dihydroxy- and o-hydroxy-o'-carboxy azo dyestuffs corresponding to the general Formula VIII $$\left[ \begin{array}{c} (CO)_{k-1}-O-Cu-O \\ | \quad\quad\quad\quad\quad\quad : \\ A\!-\!-\!-\!N\!=\!\!=\!\!=\!N\!-\!-\!B \end{array} \right]\!\!-\!(SO_3H)_q \\ -NH\!-\!P_y$$

(VIII)

wherein
A represents a radical selected from the group consisting of radicals of the benzene or naphthalene series,
B represents a radical of the naphthalene series,
Py represents a pyrimidyl radical bound to the NH group in the o-position to a ring nitrogen atom and containing 2 halogen atoms in the o-position and 1 halogen atom in the m-position to a ring nitrogen atom, the halogen having an atomic weight of at least 35 and at most 80,
$k$ represents a whole positive number of at most 2, and
$q$ represents a whole positive number of at most 4,
the group —$(CO)_{k-1}$—O—Cu—O— being bound to vicinal positions with respect to the azo group.

These compounds are advantageously the derivatives of coupling products of o-hydroxyaminobenzene compounds and the hydroxyaminonaphthalene sulphonic acids mentioned above.

A fourth group of preferred dyes therefore corresponds to the general Formula IX.

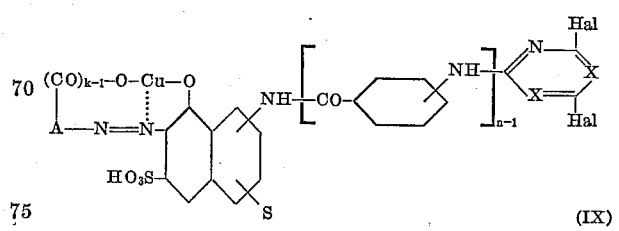

(IX)

In this formula

A represents a radical of the benzene series,

Hal, $X_1$, $X_2$ and S have the same meanings as indicated under Formula VI, and k and n each means 1 and 2.

In these compounds also, the amino substituent of the naphthalene radical is preferably in the 6-position (counting $HO/SO_3H$ as 1.3) if S is hydrogen, and it is in the 8-position if S is a $SO_3H$ group either in the 5- or, preferably, in the 6-position.

Of all these preferred end products, finally the ones of particular importance are those which contain at least two to three sulphonic acid groups.

In the form of their ammonium or alkali metal salts, the reactive dyestuffs produced according to the present processes are powders which are soluble in hot water. The new dyestuffs are suitable for the dyeing and printing of fibrous material containing hydroxyl groups or protein, in particular of cotton, in yellow, orange, red, violet, blue, brown to black shades. Cellulose material is impregnated advantageously at a low temperature, for example 20–50°, with the dyestuff solution and the dyestuff is then fixed by a treatment with acid binding agents; as such are used, for example, sodium carbonate, caustic soda lye, di- and tri-sodium phosphate and, at over 50°, also sodium bicarbonate. Although this treatment can be performed with these agents even at a slightly raised temperature, it is often performed, advantageously after an intermediate drying of the goods, with better results at temperatures of from, for example, 60–160°. Instead of this alkaline aftertreatment of the impregnated goods, the goods can also be treated before or during the impregnation process with the acid binding agents. By this treatment with agents having an alkaline reaction, after soaping, cellulose dyeings are obtained which have excellent wet fastness properties, in particular first-rate fastness to boiling.

For the dyeing of protein fibrous material, the new dyestuffs are used advantageously in a weakly acid, for example a weakly acetic acid, bath. Often the addition of compounds containing basic nitrogen, for example of polyquaternary ammonium compounds, and/or of non-ionogenic distributing agents having the properties of protective colloids, is necessary or indicated. If necessary, the dyeing is then given an after treatment with mineral acid binding agents such as e.g. ammonia or hexamethylene tetramine.

The following examples serve to illustrate the invention without limiting it in anyway. In these examples, as well as in the foregoing, the temperatures are in degrees centigrade. Parts are given as parts by weight and their relationship to parts by volume is as that of grammes to cubic centimetres.

*Example 1*

67.2 parts of the amino monoazo dyestuff of the formula

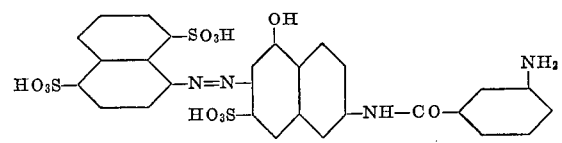

are dissolved in 1200 parts of water and caustic soda lye is added so that the pH value of the solution is 6.5–7.0. 26.2 parts of 2.4.5.6-tetrachloropyrimidine, dissolved in 100 parts of acetone and an aqueous solution of sodium carbonate are added dropwise simultaneously within 1 hour at 30–35° in such a way that the reaction always remains neutral. As soon as the condensation is completed, the dyestuff of the formula

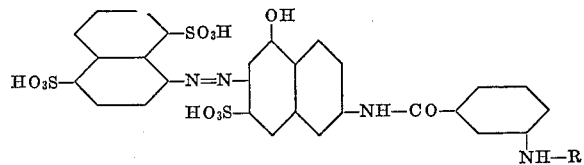

in which R represents the 4.5.6-trichloropyrimidyl-(2) or the 2.5.6-trichloropyrimidyl-(4) radical, is precipitated by the addition of sodium chloride. It is filtered off, washed with diluted sodium chloride solution and dried carefully in the vacuum. It is a dark powder which dissolves in water with a red colour.

Cotton is treated at 50° in the foulard with a 1% solution of this dyestuff which contains also 20 parts of sodium carbonate and 200 parts of urea per litre. The impregnated goods are dried, then heated for 4 minutes at 140–160° and finally soaped at the boil for 30 minutes. An even red dyeing is obtained which is fast to boiling in water.

Dyestuffs with similar properties are obtained if, instead of the amino monoazo dyestuff mentioned above, corresponding number of parts of the dyestuffs named in the following Table I are used and these dyestuffs are condensed under the same conditions with the corresponding number of parts of the halogen pyrimidine compounds given in the table.

TABLE I

| No. | Amino azo dyestuffs | Condensing agents | Shade on cotton |
| --- | --- | --- | --- |
| 1 | 1-aminobenzene-2.5-disulphonic acid → 2-(3'-aminobenzoylamino)-5-hydroxynaphthalene-7-sulphonic acid. | 2.4.5.6-tetrachloropyrimidine. | Orange. |
| 2 | 1-aminobenzene-2.5-disulphonic acid → 1-(3'-aminobenzoylamino)-8-hydroxynaphthalene-3.6-disulphonic acid. | ____do____ | Red. |
| 3 | 2-aminonaphthalene-6.8-disulphonic acid → 2-(4'-aminobenzoylamino)-5-hydroxynaphthalene-7-sulphonic acid. | 5-bromo-2.4.6-trichloropyrimidine. | Red. |
| 4 | 1-aminobenzene-2-sulphonic acid → 1-(3'-aminobenzoylamino)-8-hydroxynaphthalene-3.6-disulphonic acid. | 2.4.5.6-tetrachloropyrimidine. | Red. |
| 5 | 1-aminobenzene-2.4-disulphonic acid → 1-(3'-aminobenzoylamino)-8-hydroxynaphthalene-3.6-disulphonic acid. | ____do____ | Red. |
| 6 | 1-aminobenzene-2.4-disulphonic acid → 2-(3-aminobenzoylamino)-5-hydroxynaphthalene-7-sulphonic acid. | ____do____ | Orange. |

*Example 2*

31.9 parts of 1-amino-8-hydroxynaphthalene-3.6-disulphonic acid are dissolved in 200 parts of water at 30–35° and caustic soda lye is added so that the pH value is from 6.0–6.5. 26.2 parts of 2.4.5.6-tetrachloropyrimidine, dissolved in 100 parts of acetone, are added dropwise within 1 hour and the pH value of the reaction mixture is kept at 6.0–6.5 by the gradual addition of caustic soda lye. After stirring for 1 hour, no more diazotisable amino groups can be traced. The reaction product is precipitated with sodium chloride, filtered off and dissolved at 20–25° in 300 parts of water. 30 parts of sodium bicarbonate are added to this solution and then the solution of 13.7 parts of diazotised 1-aminobenzene-2-carboxylic acid is poured in within 30 minutes. As soon as the coupling is completed, 20% by volume of sodium chloride and sufficient hydrochloric acid are added so that the new dyestuff of the formula

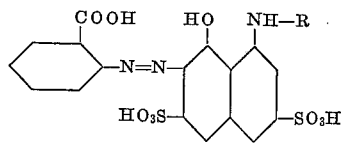

wherein R is the 4.5.6-trichloropyrimidyl-(2) or the 2.5.6-trichloropyrimidyl-(4) radical, precipitates. It is filtered off and dried in a vacuum at 40–45°. It is a dark red powder which dissolves in water with a red colour.

On treating cotton with a 1% solution of this dyestuff in the foulard, drying, then treating with a solution containing 2% caustic soda lye and 30% sodium chloride, fixing for 4 minutes at 140–160°, rinsing and soaping for 30 minutes at the boil, then a brilliant red dyeing is obtained which is fast to water boiling.

If in the above example instead of the condensation product produced from 1-amino-8-hydroxynaphthalene-3.6-disulphonic acid and 2.4.5.6-tetrachloropyrimidine as acylation agent, the corresponding number of parts of the coupling components named in the following Table II and of the acylation agents are used and, instead of 1-aminobenzene-2-carboxylic acid, the corresponding number of parts of the following diazo components are used, then dyestuffs having similar properties are obtained.

neutral with sodium carbonate. 26.2 parts of 2.4.5.6-tetrachloropyrimidine, dissolved in 100 parts of acetone, are then added dropwise at 20–25° simultaneously with an aqueous trisodium phosphate solution so that the reaction mixture always remains neutral. As soon as the reaction is complete, the reaction product is precipitated by the addition of sodium chloride, filtered off, dissolved in 300 parts of water and the solution is diazotised at 0° with 25 parts of hydrochloric acid 30% and 6.9 parts of sodium nitrite. The diazonium compound formed is poured into a solution of 20.4 parts of 1-phenyl-pyrazolone-(5)-carboxylic acid-(3) in 200 parts of water and 34.0 parts of sodium bicarbonate. On completion of the coupling, the new dyestuff of the formula

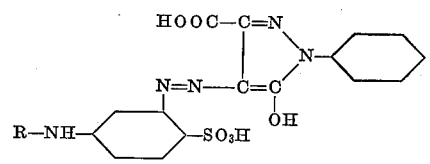

wherein R is the 4.5.6-trichloropyrimidyl-(2) or the 2.5.6-trichloropyrimidyl-(4) radical, is precipitated with sodium chloride. It is filtered off and dried in the vacuum at 40–45°. It is a yellow powder which dissolves in water with a yellow colour.

If cotton is treated in the foulard at 20° with a 1% aqueous solution of this dyestuff, dried, then treated with a 2% sodium carbonate solution which also contains 30% sodium chloride, then steamed for 5 minutes at 100–103°, then rinsed and finally soaped at the boil for 30 minutes, then a yellow dyeing which is fast to boiling is obtained.

Dyestuffs having similar properties are obtained if instead of the diazo component obtained by condensation of 1.3-diaminobenzene-4-sulphonic acid with 2.4.5.6-tetrachloropyrimidine as acylating agent, the corresponding number of parts of the diazo components and acylating agents given in the following Table III are used and, in-

TABLE II

| No. | Diazonium compound from— | Coupling component | Acylating agent | Shade on cotton |
|---|---|---|---|---|
| 1 | 1-amino-4-acetylaminobenzene-2-sulphonic acid. | 1-amino-8-hydroxynaphthalene-3.6-disulphonic acid. | 2.4.5.6-tetrachloropyrimidine | Red violet. |
| 2 | 1-amino-3-acetylaminobenzene-4-sulphonic acid. | ____do____ | ____do____ | Blueish red. |
| 3 | 1-aminobenzene-2.5-disulphonic acid | 2-amino-8-hydroxynaphthalene-6-sulphonic acid. | ____do____ | Red-orange. |
| 4 | 1-amino-3-acetylaminobenzene-6-sulphonic acid. | ____do____ | 5-bromo-2.4.6-trichloropyrimidine | Scarlet. |
| 5 | 4-(3'-methyl-4'-aminobenzoylamino)-1-hydroxybenzene-2-carboxylic acid-6-sulphonic acid. | 2-amino-5-hydroxynaphthalene-7-sulphonic acid. | 2.4.5.6-tetrachloropyrimidine | Red. |
| 6 | 1-amino-4-acetylaminobenzene-3-carboxylic acid. | ____do____ | ____do____ | Scarlet. |
| 7 | 1-amino-4-acetylaminobenzene-2-carboxylic acid. | ____do____ | ____do____ | Do. |
| 8 | 1-aminobenzene-2-sulphonic acid | 1-amino-8-hydroxynaphthalene-3.6-disulphonic acid. | ____do____ | Red. |
| 9 | 1-aminobenzene-2-carboxylic acid-4-sulphonic acid. | 2-amino-5-hydroxynaphthalene-7-sulphonic acid. | ____do____ | Orange. |
| 10 | 1-amino-4-acetylaminobenzene-2-sulphonic acid. | ____do____ | 5-bromo-2.4.6-trichloropyrimidine | Scarlet. |
| 11 | 2-aminonaphthalene-4.8-disulphonic acid | ____do____ | 2.4.5.6-tetrachloropyrimidine | Red. |
| 12 | 1-aminobenzene-2.5-disulphonic acid | 2-(3'-aminobenzoylamino)-5-hydroxynaphthalene-7-sulphonic acid. | ____do____ | Do. |
| 13 | 1-amino-4-acetylaminobenzene-2-sulphonic acid. | 1-amino-8-hydroxynaphthalene-4.6-disulphonic acid. | ____do____ | Ruby red. |
| 14 | 1-amino-3-acetylaminobenzene-6-sulphonic acid. | 1-amino-5-hydroxynaphthalene-7-sulphonic acid. | ____do____ | Orange. |
| 15 | ____do____ | 1-amino-8-hydroxynaphthalene-3.6-disulphonic acid. | ____do____ | Red. |
| 16 | 1-amino-3-benzoylaminobenzene-6-sulphonic acid. | 1-amino-8-hydroxynaphthalene-3.6-disulphonic acid. | 2.4.5.6-tetrachloropyrimidine | Do. |
| 17 | 1-amino-3-acetylaminobenzene-6-sulphonic acid. | 2-amino-5-hydroxynaphthalene-7-sulphonic acid. | ____do____ | Orange. |
| 18 | 1-amino-4-methylbenzene-6-sulphonic acid | 1-amino-8-hydroxynaphthalene-3.6-disulphonic acid. | ____do____ | Blueish red. |
| 19 | 1-amino-4-chlorobenzene-6-sulphonic acid | ____do____ | ____do____ | Do. |
| 20 | ____do____ | ____do____ | 5-bromo-2.4.6-trichloropyrimidine | Do. |
| 21 | 1-amino-4-methylbenzene-6-sulphonic acid. | 2-amino-5-hydroxynaphthalene-7-sulphonic acid. | ____do____ | Orange. |
| 22 | ____do____ | ____do____ | 2.4.5.6-tetrachloropyrimidine | Do. |

*Example 3*

18.8 parts of 1.3-diaminobenzene-4-sulphonic acid are dissolved in 200 parts of water and the reaction is made neutral stead of 1-phenyl-pyrazolone-(5)carboxylic-3-acid, the corresponding number of parts of the coupling components given in the same table are used.

TABLE III

| No. | Diazonium compound | Acylating agent | Coupling component | Shade on cotton |
|---|---|---|---|---|
| 1 | 1.4-diaminobenzene-3-sulphonic acid | 2.4.5.6-tetrachloropyrimidine | 2-acetylamino-5-hydroxynaphthalene-7-sulphonic acid. | Scarlet. |
| 2 | 1.3-diaminobenzene-4-sulphonic acid | ___do___ | 1-(2'-chloro-5'-sulphophenyl-3-methyl-5-pyrazolone. | Greenish yellow. |
| 3 | ___do___ | ___do___ | 1-naphthyl-(2')-3-methyl-5-pyrazolone-4',8'-disulphonic acid. | Lemon yellow. |
| 4 | ___do___ | 5-bromo-2.4.6-trichloropyrimidine | 1-benzoylamino-8-hydroxynaphthalene-3.6-disulphonic acid. | Blueish red. |
| 5 | ___do___ | ___do___ | 1-acetylamino-8-hydroxynaphthalene-3.6-disulphonic acid. | Red. |
| 6 | ___do___ | 2.4.5.6-tetrachloropyrimidine | 1-phenyl-3-methyl-5-pyrazolone-3'-sulphonic acid. | Yellow. |
| 7 | ___do___ | ___do___ | 2-amino-1-hydroxybenzene-4-sulphonic acid $\xrightarrow{Cu}$ 1.3-dihydroxybenzene. | Brown. |
| 8 | ___do___ | 5-bromo-2.4.6-trichloropyrimidine | 1-phenyl-3-methyl-5-pyrazolone-3'-sulphonic acid. | Yellow. |
| 9 | 1.4-diaminobenzene-3-sulphonic acid | 2.4.5.6-tetrachloropyrimidine | 2-acetylamino-8-hydroxynaphthalene-6-sulphonic acid. | Red. |
| 10 | ___do___ | ___do___ | 1-(4'-sulphophenyl)-3-methyl-5-pyrazolone. | Yellow. |
| 11 | 1.3-diaminobenzene-4-sulphonic acid | ___do___ | 1-naphthyl-(2')-3-methyl-5-pyrazolone-5',7'-disulphonic acid. | Do. |
| 12 | 1.4-diaminobenzene-3-sulphonic acid | 2.4.5.6-tetrachloropyrimidine | 3-methyl-5-pyrazolone. | Do. |
| 13 | ___do___ | ___do___ | 1-benzoylamino-5-hydroxynaphthalene-7-sulphonic acid. | Red. |
| 14 | 1.3-diaminobenzene-4-sulphonic acid | ___do___ | 1-acetylamino-8-hydroxynaphthalene-3.6-disulphonic acid. | Do. |
| 15 | 4.4'-diaminodiphenyl-3-sulphonic acid | ___do___ | ___do___ | Violet. |
| 16 | 1.4-diaminobenzene-3-sulphonic acid | 5-bromo-2.4.6-tetrachloropyrimidine | 2-acetylamino-5-hydroxynaphthalene-7-sulphonic acid. | Orange. |
| 17 | ___do___ | 5-bromo-2.4.6-trichloropyrimidine | 1-acetylamino-8-hydroxynaphthalene-3.6-disulphonic acid. | Red violet. |
| 18 | 1.3-diaminobenzene-4-sulphonic acid | 2.4.5.6-tetrachloropyrimidine | 1-benzoylamino-8-hydroxynaphthalene-3.6-disulphonic acid. | Blueish red. |
| 19 | 1-(4'-aminobenzoylamino)-3-aminobenzene-4-sulphonic acid. | ___do___ | 1-acetylamino-8-hydroxynaphthalene-3.6-disulphonic acid. | Do. |
| 20 | ___do___ | ___do___ | 1-(2',5'-disulphophenyl)-3-methyl-5-pyrazolone. | Greenish yellow. |
| 21 | 1.3-diaminobenzene-4-sulphonic acid | ___do___ | 1-(3'-sulphophenyl)-3-methyl-5-iminopyrazole. | Yellow. |
| 22 | ___do___ | 5-bromo-2.4.6-tetrachloropyrimidine | ___do___ | Do. |
| 23 | ___do___ | ___do___ | 1-(4'-sulphophenyl)-3-methyl-5-iminopyrazole. | Do. |
| 24 | ___do___ | 2.4.5.6-tetrachloropyrimidine | ___do___ | Do. |

*Example 4*

56.5 parts of the amino monoazo duestuff of the formula

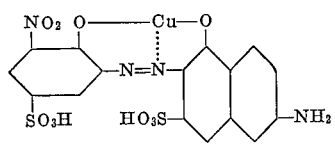

are dissolved in 1200 parts of water, the reaction being made neutral with sodium carbonate. 26.2 parts of 2.4.5.6-tetrachloropyrimidine, dissolved in 100 parts of acetone, and an aqueous disodium phosphate solution are so added dropwise to this solution within one hour at 30–35° that the reaction mixture always remains neutral. As soon as no more free amino groups can be traced, the new dyestuff of the formula

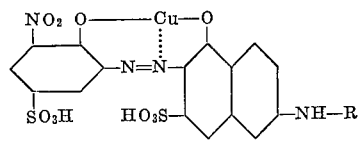

wherein R is the 4.5.6-trichloropyrimidyl-(2) or the 2.5.6-trichloropyrimidyl-(4) radical, is precipitated by the addition of sodium chloride. It is filtered off and dried in a vacuum at 40–45°. The dark red powder dissolves in water with a ruby red colour.

2 parts of the dyestuff are dissolved in 4000 parts of water, and 20 parts of caustic soda lye of 36° Bé are added. 100 parts of cotton are entered at 40–45° and the bath is heated within 30 minutes to 80–85° and at the same time sodium chloride is added so that finally the content is 150 g. per litre. Dyeing is performed at the boil for 1 hour at this temperature. The goods are then rinsed and soaped for 30 minutes at the boil. The soaping solution is only coloured a little. A level ruby red dyeing is obtained which is fast to light, water and water boiling.

Dyestuffs having similar properties are obtained if instead of the amino azo dyestuff given above, the corresponding number of parts of the complex copper compound of the amino azo dyestuffs given in the following Table IV are used and the complex copper compounds are condensed under the same reaction conditions with the corresponding number of parts of the halogen pyrimidine compounds given in the same table.

TABLE IV

| No. | Amino azo dyestuffs | Condensing agents | Shade on cotton |
|---|---|---|---|
| 1 | 2-aminobenzene-1-carboxylic acid-4-sulphonic acid → 2-(4'-aminobenzoylamino)-5-hydroxynaphthalene-7-sulphonic acid. | 2.4.5.6-tetrachloropyrimidine | Scarlet. |
| 2 | 2-amino-6-chloro-1-hydroxybenzene-4-sulphonic acid → 2-amino-5-hydroxynaphthalene-7-sulphonic acid. | 5-bromo-2.4.6-trichloropyrimidine | Bordeaux. |
| 3 | 2-amino-1-hydroxybenzene-4.6-disulphonic acid → 2-amino-5-hydroxynaphthalene-7-sulphonic acid. | 2.4.5.6-tetrachloropyrimidine | Ruby. |
| 4 | 2-amino-1-hydroxybenzene-4-methyl sulphone → 1-amino-8-hydroxynaphthalene-3.6-disulphonic acid. | 2.4.5.6-tetrachloropyrimidine | Violet. |
| 5 | 2-amino-1-hydroxybenzene-4.6-disulphonic acid → 2-amino-5-hydroxynaphthalene-7-sulphonic acid. | 5-bromo-2.4.6-trichloropyrimidine | Ruby. |

TABLE IV—Continued

| No. | Amino azo dyestuffs | Condensing agents | Shade on cotton |
|---|---|---|---|
| 6 | 2-amino-1-hydroxybenzene-4-sulphonic acid → 1.3-dihydroxy-benzene ← 1-amino-4-acetylaminobenzene-2-sulphonic acid saponified. | 2.4.5.6-tetrachloropyrimidine | Brown. |
| 7 | 1-aminobenzene-2.5-disulphonic acid → 1-amino-2.5-dimethoxy-benzene → 2-aminoethylamino-5-hydroxynaphthalene-7-sulphonic acid. | ...do | Blue. |
| 8 | 4-amino-4'-[3''-methol-5''-oxo-pyrazoliny-1-(1'')]-stilbene-3.3'-disulphonic acid ← 1-aminobenzene-2-carboxylic acid-4-sulphonic acid. | ...do | Yellow. |
| 9 | 6-nitro-1-diazo-2-hydroxynaphthalene-4-sulphonic acid → 2-amino-5-hydroxynaphthalene-7-sulphonic acid. | ...do | Violet. |
| 10 | 2-amino-1-hydroxybenzene-4-methyl sulphone → 1-amino-8-hydroxynaphthalene-3.6-disulphonic acid. | 5-bromo-2.4.6-trichloropyrimidine | Do. |
| 11 | 2-amino-1-hydroxybenzene-4.6-disulphonic acid → 2-(3'-amino-benzoylamino)-5-hydroxynaphthalene-7-sulphonic acid. | 2.4.5.6-tetrachloropyrimidine | Ruby. |
| 12 | ...do | 5-bromo-2.4.6-trichloropyrimidine | Do. |
| 13 | 2-amino-1-hydroxybenzene-4.6-disulphonic acid → 2-(4'-amino-benzoylamino)-5-hydroxynaphthalene-7-sulphonic acid. | ...do | Do. |
| 14 | ...do | 2.4.5.6-tetrachloropyrimidine | Do. |
| 15 | 2-aminobenzene-1-carboxylic acid-4-sulphonic acid → 2-(3'-amino-benzoylamino)-5-hydroxynaphthalene-7-sulphonic acid. | ...do | Scarlet. |
| 16 | 4-amino-4'-[3''-methyl-5''-oxopyrazolinyl-(1'')]-stilbene-3.3'-disulphonic acid ← 1-aminobenzene-2-carboxylic acid-5-sulphonic acid. | 2.4.5.6-tetrachloropyrimidine | Yellow. |
| 17 | ...do | ...do | Do. |
| 18 | 1-amino-2-hydroxybenzene-4.6-disulphonic acid → 1-(3'-amino-phenyl)-3-methyl-(5)-pyrazolone. | 5-bromo-2.4.6-trichloropyrimidine 2.4.5.6-tetrachloropyrimidine | Yellow-brown. |
| 19 | ...do | | Do. |
| 20 | 1-amino-2-hydroxybenzene-4.6-disulphonic acid → 1-(4'-amino-phenyl)-3-methyl-(5)-pyrazolone. | 5-bromo-2.4.6-trichloropyrimidine | Brown. |
| 21 | ...do | ...do | Do. |
| 22 | 1-aminobenzene-2-carboxylic acid-4-sulphonic acid → 1-(3'-aminophenyl)-3-methyl-(5)-pyrazolone. | 2.4.5.6-tetrachloropyrimidine | Yellow. |
| 23 | ...do | ...do | Do. |
| 24 | 1-aminobenzene-2-carboxylic acid → 5-sulphonic acid → 1-(4'-aminophenyl)-3-methyl-(5)-pyrazolone. | 5-bromo-2.4.6-trichloropyrimidine | Yellow-brown. |
| 25 | ...do | 2.4.5.6-tetrachloropyrimidine | Do. |

*Example 5*

40.7 parts of the amino monazo dyestuff

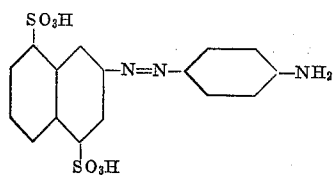

are dissolved in 500 parts of water with a neutral reaction by means of sodium carbonate. 26.3 parts of 2.4.5.6-tetrachloropyrimidine, dissolved in 100 parts of acetone, and, at the same time, an aqueous sodium carbonate solution are added dropwise to this solution 30–35° within one hour in such a manner that the reaction mixture always has a neutral reaction. As soon as no more free amino groups can be traced, the dyestuff of the formula

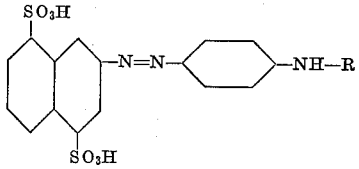

wherein R is the 4.5.6-trichloropyrimidyl-(2) or the 2.5.6-trichloropyrimidyl-(4) radical, is precipitated with sodium chloride. It is filtered off and washed with diluted sodium chloride solution. It is a yellow powder which dissolves in water with a yellow colour. If cotton is impregnated with a 1% solution of this dyestuff in the foulard, dried, then treated with a solution containing 2% sodium bicarbonate and 30% sodium chloride, then heated for 4 minutes at 140–160°, then rinsed and soaped at the boil for 30 minutes, it is dyed yellow and the dyeing is fast to boiling.

If, instead of the 40.7 parts of the above dyestuff, the corresponding number of parts of the dyestuffs given in the following table are used and the dyestuff is condensed with one of the halogen pyrimidine compounds given, then when the above dyeing procedure is followed, dyestuffs are obtained which produce similarly wet-fast cellulose dyeings.

TABLE V

| No. | Amino monoazo dyestuff | Condensing agent | Shade on cotton |
|---|---|---|---|
| 1 | 2-aminonaphthalene-4.8-disulphonic acid → 1-amino-2-methoxy-5-methyl-benzene. | 2.4.5.6-tetrachloropyrimidine | Yellow. |
| 2 | 2-aminonaphthalene-4.8-disulphonic acid → 1-amino-3-methylbenzene | ...do | Do. |
| 3 | 1-aminonaphthalene-3.6-disulphonic acid → 1-amino-3-methylbenzene | ...do | Do. |
| 4 | 1-aminonaphthalene-3.6-disulphonic acid → 1-amino-3-acetylaminobenzene | ...do | Do. |
| 5 | 2-aminonaphthalene-3.6-disulphonic acid → 1-amino-2-ethoxybenzene | ...do | Do. |
| 6 | 2-aminonaphthalene-3.6-disulphonic acid → 1-amino-3-methylbenzene | 5-bromo-2.4.6-trichloropyrimidine | Do. |
| 7 | 2-aminonaphthalene-6.8-disulphonic acid → 1-amino-3-methylbenzene | ...do | Do. |
| 8 | 2-aminonaphthalene-4.8-disulphonic acid → 1-amino-2-methylbenzene | 2.4.5.6-tetrachloropyrimidine | Do. |
| 9 | 2-aminonaphthalene-6.8-disulphonic acid → 1-amino-3-acetylaminobenzene | ...do | Do. |
| 10 | 2-aminonaphthalene-6.8-disulphonic acid → 1-amino-2-methoxy-5-methyl-benzene. | ...do | Do. |
| 11 | 2-aminonaphthalene-5.7-disulphonic acid → 1-amino-2-ethoxybenzene | ...do | Do. |
| 12 | 2-aminonaphthalene-5.7-disulphonic acid → 1-amino-3-carbomethoxyamino-benzene. | ...do | Do. |
| 13 | 2-aminonaphthalene-4.8-disulphonic acid → 1-amino-2-methoxy-5-methyl-benzene. | 5-bromo-2.4.6-trichloropyrimidine | Do. |
| 14 | 2-aminonaphthalene-3.6.8-trisulphonic acid → 1-amino-3-methylbenzene | 2.4.5.6-tetrachloropyrimidine | Do. |
| 15 | 1-aminonaphthalene-3.6.8-trisulphonic acid → 1-amino-3-methylbenzene | ...do | Do. |

Example 6

30.7 parts of the amino monoazo dyestuff of the formula

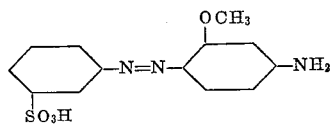

are dissolved in 1500 parts of water with a neutral reaction with the aid of sodium bicarbonate. 26.2 parts of 2.4.5.6-tetrachloropyrimidine, dissolved in 100 parts of acetone, and, at the same time, a diluted aqueous sodium carbonate solution are then so added dropwise within 1 hour at 30–35° that the pH value of the reaction mixture is always about 7.0. On completion of the reaction, the dyestuff of the formula

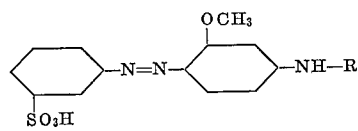

wherein R is the 4.5.6-trichloropyrimidyl-(2) or the 2.5.6-trichloropyrimidyl-(4) radical, is precipitated by the addition of sodium chloride. It is filtered off and dried. The dyestuff is a yellow powder which dissolves in water with a yellow colour.

2 parts of the dyestuff are dissolved in 4000 parts of water and 20 parts of caustic soda lye of 36° Bé are added. 100 parts of cotton are entered at 40–45° and the bath is heated within 30 minutes to 80–85°. At the same time sodium chloride is added so that finally the content is 150 g. per litre. Dyeing is performed for 1 hour at this temperature. The goods are then rinsed and soaped at the boil for 30 minutes. The soaping solution is only coloured a little. A level, clear yellow dyeing is obtained which is fast to light, washing and water boiling.

Similar dyestuffs are obtained by using compounds given in the following table when the corresponding number of parts are used as described above.

Example 7

56.2 parts of the aminodisazo dyestuff

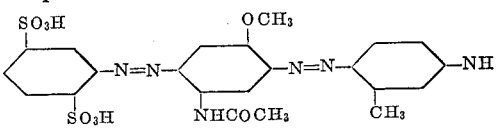

are dissolved in 1500 parts of water with a neutral reaction with the aid of sodium carbonate. 26.2 parts of 2.4.5.6-tetrachloropyrimidine dissolved in 100 parts of acetone and an aqueous solution of disodium phosphate are so added dropwise simultaneously to this solution within 1 hour at 30–35° that the reaction mixture always has a neutral reaction. As soon as no more free amino groups can be traced the dyestuff of the formula

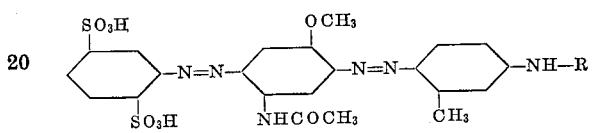

wherein R represents the 4.5.6-trichloropyrimidyl-(2) or the 2.5.6-trichloropyrimidyl-(4) radical, is precipitated by the addition of sodium chloride. It is filtered off, washed with a diluted sodium chloride solution and dried in a vacuum at 40–45°. The dyestuff is an orange coloured powder which dissolves in water with a yellow-orange colour.

If cotton is impregnated with a 1% solution of this dyestuff with the addition of 20 parts of sodium carbonate per litre at 50° in the foulard, rolled out, heated for 2 hours at 95°, rinsed and then soaped at the boil for 30 minutes, then yellow orange dyeings are obtained which are fast to boiling.

Similar dyestuffs are obtained on using corresponding parts of the compounds given in the following table in the manner described above.

TABLE VI

| No. | Amino monoazo dyestuff | Condensing agent | Shade on cotton |
|---|---|---|---|
| 1 | 1-amino-4-hydroxybenzene-3-carboxylic acid-5-sulphonic acid → 1-amino-2-methoxybenzene. | 2.4.5.6-tetrachloropyrimidine | Yellow. |
| 2 | 1-aminobenzene-2.5-disulphonic acid → 1-amino-3-acetylaminobenzene. | do | Do. |
| 3 | 1-aminobenzene-2.4-disulphonic acid → 1-amino-3-carbethoxyaminobenzene. | do | Do. |
| 4 | 1-aminobenzene-2.5-disulphonic acid → 1-amino-2-methoxy-5-methylbenzene. | 5-bromo-2.4.6-trichloropyrimidine | Do. |
| 5 | 1-aminobenzene-2.5-disulphonic acid → 1-amino-3-ethoxybenzene | 2.4.5.6-tetrachloropyrimidine | Do. |
| 6 | 1-aminobenzene-2-carboxylic acid-4-sulphonic acid → 1-amino-3-acetylaminobenzene. | do | Do. |
| 7 | 1-aminobenzene-2-carboxylic acid-5-sulphonic acid → 1-aminobenzene. | do | Do. |
| 8 | 1-aminobenzene-2-carboxylic acid-4-sulphonic acid → 1-amino-3-methylbenzene. | do | Do. |
| 9 | 1-aminobenzene-2-carboxylic acid-5-sulphonic acid → 1-amino-2-methoxy-5-methylbenzene. | 5-bromo-2.4.6-trichloropyrimidine | Do. |
| 10 | 1-amino-4-hydroxybenzene-3-carboxylic acid-5-sulphonic acid → 1-aminobenzene. | 2.4.5.6-tetrachloropyrimidine | Do. |
| 11 | 1-aminobenzene-2.5-disulphonic acid → 1-amino-2-methoxy-5-methylbenzene. | do | Do. |
| 12 | 6-methyl-2-(3'-sulpho-4'-aminophenyl)-benzthiazole-sulphonic acid-(7) → 1-amino-3-carbomethoxyaminobenzene. | do | Do. |
| 13 | 6-methyl-2-(3'-sulpho-4'-aminophenyl)-benzthiazole sulphonic acid-(7) → 1-amino-3-methylbenzene. | do | Do. |
| 14 | 2-(4''-aminophenyl)-[naphtho-1'.2':4.5]-1.2.3-triazole-2''.6'-disulphonic acid → 1-aminobenzene. | do | Do. |
| 15 | 2-(4''-aminophenyl)-[naphtho-1'.2':4.5]-1.2.3-triazole-2''.3'.6'-trisulphonic acid → 1-amino-3-methyl benzene. | do | Yellow-orange. |
| 16 | mixture from 3-aminopyrene-5.8-disulphonic acid and 3-aminopyrene-5.10-disulphonic acid → 1-amino-3-methyl benzene. | do | Do. |
| 17 | mixture from 3-aminopyrene-5.8-disulphonic acid and 3-aminopyrene-5.10-disulphonic acid → 1-amino-3-carboethoxyaminobenzene. | do | |

TABLE VII

| No. | Amino disazo dyestuff | Condensing agent | Shade on cotton |
|---|---|---|---|
| 1 | HO$_3$S—⬡—N=N—⬡(SO$_3$H)—N=N—⬡(NHCOCH$_3$)—NH$_2$ | 2.4.5.6-tetrachloropyrimidine | Yellow-orange. |
| 2 | HO$_3$S—⬡—N=N—⬡(SO$_3$H)—N=N—⬡(CH$_3$)—NH$_2$ | 2.4.5.6-tetrachloropyrimidine | Yellow-orange. |
| 3 | (SO$_3$H, SO$_3$H)⬡—N=N—⬡(NHCOCH$_3$)—N=N—⬡—NH$_2$ | 5-bromo-2.4.6-trichloropyrimidine | Yellow-orange. |
| 4 | (SO$_3$H, SO$_3$H)⬡—N=N—⬡(CH$_3$)—N=N—⬡(OCH$_3$)—NH$_2$ | 2.4.5.6-tetrachloropyrimidine | Yellow-orange. |
| 5 | HO$_3$S—⬡—N=N—⬡(SO$_3$H, fused ring)—N=N—⬡—NH$_2$ | 2.4.5.6-tetrachloropyrimidine | Orange. |
| 6 | HO$_3$S—⬡—N=N—⬡(SO$_3$H, fused ring)—N=N—⬡—NH$_2$ | 2.4.5.6-tetrachloropyrimidine | Orange. |
| 7 | (SO$_3$H, SO$_3$H)naphthyl—N=N—⬡(OCH$_3$, CH$_3$)—N=N—⬡(CH$_3$)—NH$_2$ | 5-bromo-2.4.6-trichloropyrimidine | Orange. |
| 8 | HO$_3$S—⬡—N=N—⬡(SO$_3$H)—N=N—⬡(CH$_3$)—NH$_2$ | 5-bromo-2.4.6-trichloropyrimidine | Yellow-orange. |
| 9 | (SO$_3$H, SO$_3$H)naphthyl—N=N—⬡—N=N—⬡(OCH$_3$)—NH$_2$ | 2.4.5.6-tetrachloropyrimidine | Orange. |
| 10 | (SO$_3$H, SO$_3$H)naphthyl—N=N—⬡(CH$_3$)—N=N—⬡(NHCOCH$_3$)—NH$_2$ | 5-bromo-2.4.6-trichloropyrimidine | Orange. |
| 11 | (SO$_3$H, SO$_3$H)naphthyl—N=N—⬡(NHCOOCH$_3$)—N=N—⬡—NH$_2$ | 2.4.5.6-tetrachloropyrimidine | Orange. |

Example 8

The condensation product from 18.8 parts of 1.3-diaminobenzene-4-sulphonic acid and 26.2 parts of 2.4.5.6-tetrachloropyrimidine obtained according to Example 3 is dissolved in 300 parts of water and diazotised with 25 parts of 30% hydrochloric acid and 6.9 parts of sodium nitrite at 0°. The diazonium compound formed is then poured into a solution of the condensation product from 31.9 parts of 1-amino-8-hydroxynaphthalene-3.6-disulphonic acid and 26.2 parts of 2.4.5.6-tetrachloropyrimidine, obtained according to Example 2, in 200 parts of water and 34.0 parts of sodium bicarbonate. On completion of the coupling, the new dyestuff of the formula R—NH—⬡—SO$_3$H  HO  NH—R
         |
         N=N—⬡(naphthyl, HO$_3$S, SO$_3$H)

wherein R is the 4.5.6-trichloropyrimidyl-(2) or the 2.5.6-trichloropyrimidyl-(4) radical, is precipitated with sodium chloride. It is filtered off and dried in the vacuum at 40–45°. It is a dark red powder which dissolves in water with a red colour.

If cotton is treated with a 1% aqueous solution of this dyestuff at 20° in the foulard, dried and then treated with a 2% sodium carbonate solution which contains 30% sodium chloride, steamed for 5 minutes at 100–103°, then rinsed and soaped for 30 minutes at the boil, then a blueish red dyeing is obtained which is fast to boiling.

Dyestuffs having similar properties are obtained if instead of the diazo components obtained by condensation of 1.3-diaminobenzene-4-sulphonic acid with 2.4.5.6-tetrachloropyrimidine the corresponding number of parts of the diazo components named in the following Table VIII are used, and instead of the coupling component obtained by condensation of 1-amino-8-hydroxynaphthalene-3.6-disulphonic acid and 2.4.5.6-tetrachloropyrimidine, the corresponding number of parts of the coupling components listed in the same table are used.

(4) naphthalene-azo-naphthalene;
(5) benzene-azo-benzene,
(B) copper complexes of the unmetallized monoazo dyestuff grouping; (C) a disazo dyestuff grouping bearing from 2 to 4 HO₃S-groups and selected from the group consisting of
(1) benzene-azo-benzene-azo-benzene,
(2) benzene-azo-benzene-azo-naphthalene,
(3) benzene-azo-naphthalene-azo-benzene.

2. A monoazo dyestuff of the formula

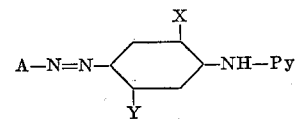

wherein A is a sulphonated benzene radical, X represents a member selected from the group consisting of hydrogen and lower alkyl, Y represents a member selected from the

TABLE VIII

| No. | Diazonium compound from | | Coupling component | Condensing agent | Shade on cotton |
|---|---|---|---|---|---|
| | Diaminobenzene compound | Condensation agent | | | |
| 1 | 1.3-diaminobenzene-4-sulphonic acid. | 5-bromo-2.4.6-trichloropyrimidine. | 1-amino-8-hydroxynaphthalene-3.6-disulphonic acid. | 5-bromo-2.4.6-trichloropyrimidine. | Blueish red. |
| 2 | ....do.... | ....do.... | 1-amino-8-hydroxynaphthalene-4.6-disulphonic acid. | ....do.... | Do. |
| 3 | ....do.... | 2.4.5.6-tetrachloropyrimidine.. | ....do.... | 2.4.5.6-tetrachloropyrimidine.. | Do. |
| 4 | 1.4-diaminobenzene-3-sulphonic acid. | ....do.... | ....do.... | ....do.... | Violet. |
| 5 | ....do.... | 5-bromo-2.4.6-trichloropyrimidine. | ....do.... | 5-bromo-2.4.6-trichloropyrimidine. | Do. |
| 6 | ....do.... | ....do.... | 1-amino-8-hydroxynaphthalene-3.6-disulphonic acid. | ....do.... | Do. |
| 7 | ....do.... | 2.4.5.6-tetrachloropyrimidine.. | ....do.... | 2.4.5.6-tetrachloropyrimidine.. | Do. |
| 8 | 1.3-diaminobenzene-4-sulphonic acid. | ....do.... | ....do.... | 5-bromo-2.4.6-trichloropyrimidine. | Blueish red. |
| 9 | ....do.... | 5-bromo-2.4.6-trichloropyrimidine. | ....do.... | 2.4.5.6-tetrachloropyrimidine.. | Do. |

*Example 9*

Cotton or staple fibre is printed by the usual methods with the following printing paste:

| | Parts |
|---|---|
| Dyestuff obtained according to Example 2 | 30 |
| Urea | 200 |
| Water | 400 |
| Sodium alginate 5% | 350 |
| Potassium carbonate | 20 |
| Total | 1000 |

After drying, the goods are steamed for 10–15 minutes or the print is fixed for 5 minutes at 145–150°, whereupon they are rinsed well and soaped for 30 minutes at the boil. The pure red print has excellent wet fastness properties.

The printing colour described above stores well.

What we claim is:

1. Water-soluble organic dyestuff consisting essentially of (I) from one to two trichloropyrimidyl residues of 2,4,5,6-tetrachloropyrimidine, (II) a dyestuff grouping of which one exchangeable hydrogen atom is replaced for each trichloropyrimidyl residue and (III) a divalent bridge member, —NH— for each trichloropyrimidyl residue, each of said bridge members being connected with one of its valences to a trichloropyrimidyl residue (I) in replacement of one of the four chlorine atoms of the 2,4,5,6-tetrachloropyrimidine and with its other valence to the site of a replaced exchangeable hydrogen atom of (II); the dyestuff grouping being a member selected from the group consisting of (A) an unmetallized monoazo dyestuff grouping bearing at most 4 HO₃S-groups and selected from the group consisting of
(1) benzene-azo-naphthalene,
(2) diphenyl-azo-naphthalene,
(3) benzene-azo-5-pyrazolone, group consisting of hydrogen, lower alkyl, lower alkoxy, lower acylamino and lower alkoxycarbonylamino groups, and Py represents a pyrimidyl radical bound to the NH group in the o-position to a ring nitrogen atom and containing 2 C-halogen atoms in the o-position and 1 C-halogen atom in the m-position to a ring nitrogen atom, the halogen having an atomic weight of at least 35 and at most 80.

3. A monoazo dyestuff of the formula

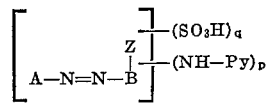

wherein A—N=N— is a radical of a diazo component of the benzene series, B represents the radical of a middle component of the naphthalene series, Py represents a pyrimidyl radical bound to the NH group in the o-position to a ring nitrogen atom and containing 2 C-halogen atoms in the o-position and 1 C-halogen atom in the m-position to a ring nitrogen atom, the halogen having an atomic weight of at least 35 and at most 80, Z represents a member selected from the group consisting of OH and NH₂ bound in o-position to the azo group, p represents a whole positive number of at most 2, and q represents a whole positive number of at most 4, the SO₃H and —NH—Py groups being directly bound to one of the radicals A and B.

4. A monoazo dyestuff of the formula

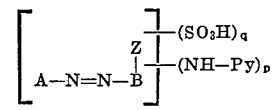

wherein A—N=N— is a radical of a diazo component of the naphthalene series, B represents the radical of a middle component of the benzene series, Py represents a pyrimidyl radical bound to the NH group in the o-position to a ring nitrogen atom and containing 2 C-halogen atoms in the o-position and 1 C-halogen atom in the m-position to a ring nitrogen atom, the halogen having an atomic weight of at least 35 and at most 80, Z represents a member selected from the group consisting of OH and $NH_2$ bound in o-position to the azo group, $p$ represents a whole positive number of at most 2, and $q$ represents a whole positive number of at most 4, the $SO_3H$ and —NH—Py groups being directly bound to one of the radicals A and B.

5. A monoazo dyestuff of the formula $$\left[ A-N=N-B \underset{}{\overset{Z}{|}} \begin{matrix} -(SO_3H)_q \\ -(NH-Py)_p \end{matrix} \right]$$

wherein A—N=N— is a radical of a diazo component of the pyrazole series, B represents the radical of a middle component of the benzene series, Py represents a pyrimidyl radical bound to the NH group in the o-position to a ring nitrogen atom and containing 2 C-halogen atoms in the o-position and 1 C1halogen atom in the m-position to a ring nitrogen atom, the halogen having an atomic weight of at least 35 and at most 80, Z represents a member selected from the group consisting of OH and $NH_2$ bound in o-position to the azo group, $p$ represents a whole positive number of at most 2, and $q$ represents a whole positive number of at most 4, the $SO_3H$ and —NH—Py groups being directly bound to one of the radicals A and B.

6. A monoazo dyestuff of the formula $$\left[ A-N=N-B \underset{}{\overset{Z}{|}} \begin{matrix} -(SO_3H)_q \\ -(NH-Py)_p \end{matrix} \right]$$

wherein A—N=N— is a radical of a diazo component of the benzene series, B represents the radical of a middle component of the pyrazole series, Py represents a pyrimidyl radical bound to the NH group in the o-position to a ring nitrogen atom and containing 2 C-halogen atoms in the o-position and 1 C-halogen atom in the m-position to a ring nitrogen atom, the halogen having an atomic weight of at least 35 and at most 80, Z represents a member selected from the group consisting of OH and $NH_2$ bound in o-position to the azo group, $p$ represents a whole positive number of at most 2, and $q$ represents a whole positive number of at most 4, the $SO_3H$ and —NH—Py groups being directly bound to one of the radicals A and B.

7. A disazo dyestuff of the formula $$A-N=N-B-N=N-\underset{Y}{\overset{X}{\bigcirc}}-NH-Py$$

wherein A represents a sulphonated naphthalene radical, B is the radical of a middle component of the benzene series, X represents a member selected from the group consisting of hydrogen and lower alkyl, Y represents a member selected from the group consisting of hydrogen, lower alkyl, lower alkoxy, lower acylamino and lower alkoxycarbonylamino groups and Py represents a pyrimidyl radical bound to the NH group in the o-position to a ring nitrogen atom and containing 2 C-halogen atoms in the o-position and 1 C-halogen atom in the m-position to a ring nitrogen atom, the halogen having an atomic weight of at least 35 and at most 80.

8. A disazo dyestuff of the formula $$A-N=N-B-N=N-\underset{Y}{\overset{X}{\bigcirc}}-NH-Py$$

wherein A represents a sulphonated benzene radical, B is the radical of a middle component of the naphthalene series, X represents a member selected from the group consisting of hydrogen and lower alkyl, Y represents a member selected from the group consisting of hydrogen, lower alkyl, lower alkoxy, lower acylamino and lower alkoxycarbonylamino groups and Py represents a pyrimidyl radical bound to the NH group in the o-position to a ring nitrogen atom and containing 2 C-halogen atoms in the o-position and 1 C-halogen atom in the m-position to a ring nitrogen atom, the halogen having an atomic weight of at least 35 and at most 80.

9. A disazo dyestuff of the formula $$A-N=N-B-N=N-\underset{Y}{\overset{X}{\bigcirc}}-NH-Py$$

wherein A is a sulphonated benzene radical, B is the radical of a middle component of the benzene series, X represents a member selected from the group consisting of hydrogen and lower alkyl, Y represents a member selected from the group consisting of hydrogen, lower alkyl, lower alkoxy, lower acylamino and lower alkoxycarbonylamino groups and Py represents a pyrimidyl radical bound to the NH group in the o-position to a ring nitrogen atom and containing 2 C-halogen atoms in the o-position and 1 C-halogen atom in the m-position to a ring nitrogen atom, the halogen having an atomic weight of at least 35 and at most 80.

10. A monoazo dyestuff of the formula $$\left[ \begin{matrix} (CO)_{k-1}O-Cu-O \\ | \quad\quad\quad\quad | \\ A \text{—} N=N \text{—} B \end{matrix} \begin{matrix} -(SO_3H)_q \\ -NH-Py \end{matrix} \right]$$

wherein
A represents a radical of the benzene series,
B represents a radical of the naphthalene series,
Py represents a pyrimidyl radical bound to the NH group in o-position to a ring nitrogen atom and containing 2 halogen atoms in the o-position and 1 halogen atom in the m-position to a ring nitrogen atom, the halogen having an atomic weight of at least 35 and at most 80,
$k$ represents a whole positive number of at most 2 and
$q$ represents a whole positive number of at most 4,
the group —$(CO)_{k-1}$—O—Cu—O— being bound to vicinal positions with respect to the azo group, the $SO_3H$ and —NH—Py groups being directly bound to one of the radicals A and B.

11. The monoazo dyestuff of the formula

[structure with $SO_3H$, HO, NHCO—, N=N, $SO_3H$, $HO_3S$—, —$SO_3H$, NH—C, Cl, N—C, $X_1$—C, Cl, X] , wherein one of $X_1$ and $X_2$ is =N— and the other of $X_1$ and $X_2$ is $$>C-Cl$$

12. The monoazo dyestuff of the formula

[structure with $SO_3H$, HO, NH—C, N=N, $NHCOCH_3$, $HO_3S$—, —$SO_3H$, Cl, N—C, $X_2$, $X_1$=C, Cl]

wherein one of $X_1$ and $X_2$ is =N— and the other is $$>C-Cl$$

13. The monoazo dyestuff of the formula

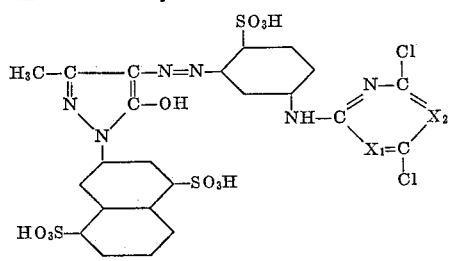

wherein one of $X_1$ and $X_2$ is $=N-$ and the other of $X_1$ and $X_2$ is

14. The cupriferous monoazo dyestuff of the formula

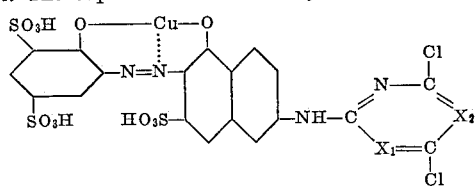

wherein one of $X_1$ and $X_2$ is $=N-$ and the other of $X_1$ and $X_2$ is

15. The cupriferous monoazo dyestuff of the formula

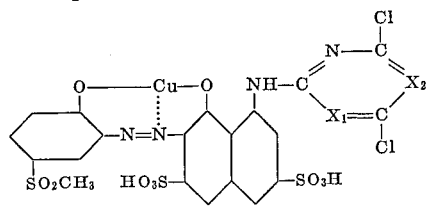

wherein one of $X_1$ and $X_2$ is $=N-$ and the other of $X_1$ and $X_2$ is

References Cited
UNITED STATES PATENTS

| | | | |
|---|---|---|---|
| 1,667,312 | 4/1928 | Fritzsche | 260—153 |
| 1,886,480 | 11/1932 | Haller et al. | 260—153 |
| 2,396,659 | 4/1946 | Kaiser | 260—146 X |
| 2,935,506 | 5/1960 | Heslop et al. | 260—154 |

OTHER REFERENCES

Johnson et al., "Chemical Reviews," vol. 13, pp. 193–303, 1933, pp. 220 and 227–8 relied on.

CHARLES B. PARKER, *Primary Examiner.*

LEON ZITVER, *Examiner.*

R. K. JACKSON, R. J. FINNEGAN,
*Assistant Examiners.*